(No Model.)

J. P. MATHIS.
GRASS KILLER.

No. 366,854. Patented July 19, 1887.

WITNESSES:
C. Neveux
C. Sedgwick

INVENTOR:
J. P. Mathis
BY Munn & Co
ATTORNEYS.

UNITED STATES PATENT OFFICE.

JORDAN P. MATHIS, OF BENTLY, MISSISSIPPI.

GRASS-KILLER.

SPECIFICATION forming part of Letters Patent No. 366,854, dated July 19, 1887.

Application filed April 20, 1887. Serial No. 235,474. (No model.)

*To all whom it may concern:*

Be it known that I, JORDAN P. MATHIS, of Bently, in the county of Calhoun and State of Mississippi, have invented a new and useful Improvement in Grass-Killers, of which the following is a full, clear, and exact description.

Reference is to be had to the accompanying drawings, forming a part of this specification, in which similar letters of reference indicate corresponding parts in all the figures.

Figure 1:
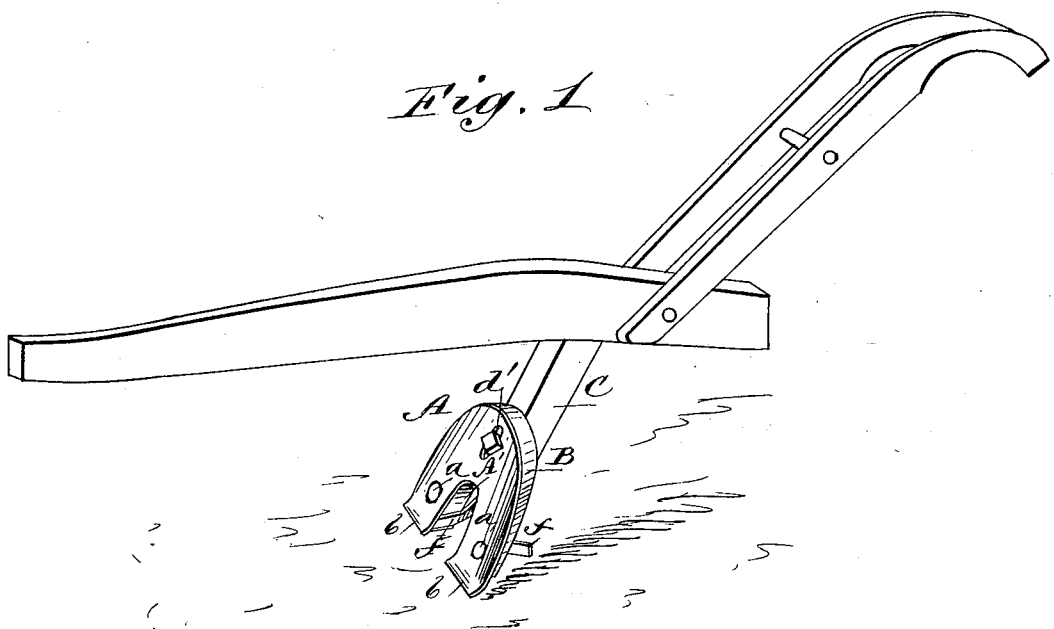
Figure 2:
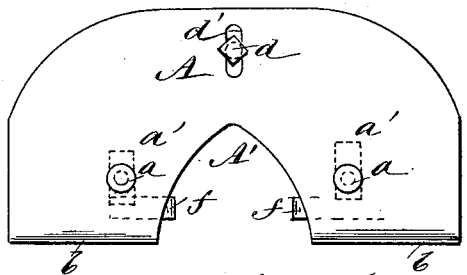

Figure 1 is a perspective view of my invention. Fig. 2 is an enlarged front view of the blade; and Fig. 3 is a plan view of the same, showing the rear knives, the wooden backing, and a bolt for attaching the blade to a plow-stock.

The invention will first be described in connection with the drawings, and then pointed out in the claim.

A represents a plate of iron or steel cut out in the center, as shown at A', to form the two sharp blades $b\ b$. The plate A is curved, as shown in Fig. 3, and the blades $b$ slant backward and outward, as shown in Fig. 1, so that they will readily clear themselves of dirt and trash. At the back of the plate A is secured the backing B, of wood. This is held to the plate by bolts $a\ a$, which pass through slots $a'\ a'$ in the backing, (shown in dotted lines in Fig. 2,) so that by loosening the nuts on the bolts $a$ the plate may be adjusted up or down, as required, to cause the blades $b\ b$ to cut deep or shallow.

Figure 3:
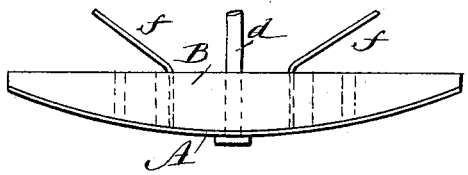

The blade A and backing B are both secured to the stock C of a plow-beam of any desired construction by the bolt $d$, passed through a slot, $d'$, and through the stock, as will be understood from Figs. 1, 2, and 3. To the blades $b\ b$, near their edges, at the central opening, $a$, are secured the deflectors or knives $f\ f$, which extend rearward and outward, as shown in Fig. 3, so that they serve to cut the grass near the row of plants and carry the dirt and grass away from the plants.

In use the blades $b\ b$ are to straddle the row of plants, so that said blades will cut the grass close to and upon both sides of the row.

I design to use the blade on plow-stocks in common use; but I may attach it to any stock made for the purpose.

Having thus described my invention, what I claim as new, and desire to secure by Letters Patent, is—

The blade A, formed of a plate curved from edge to edge and cut out in the center to form two side blades, $b\ b$, which slope from their inner edges backward, in combination with the rear diverging blades, $f$, held adjacent to the inner corners of the blades $b$, substantially as described.

JORDAN P. MATHIS.

Witnesses:
J. A. B. MILLER,
S. C. LEE.